United States Patent Office 2,992,076
Patented July 11, 1961

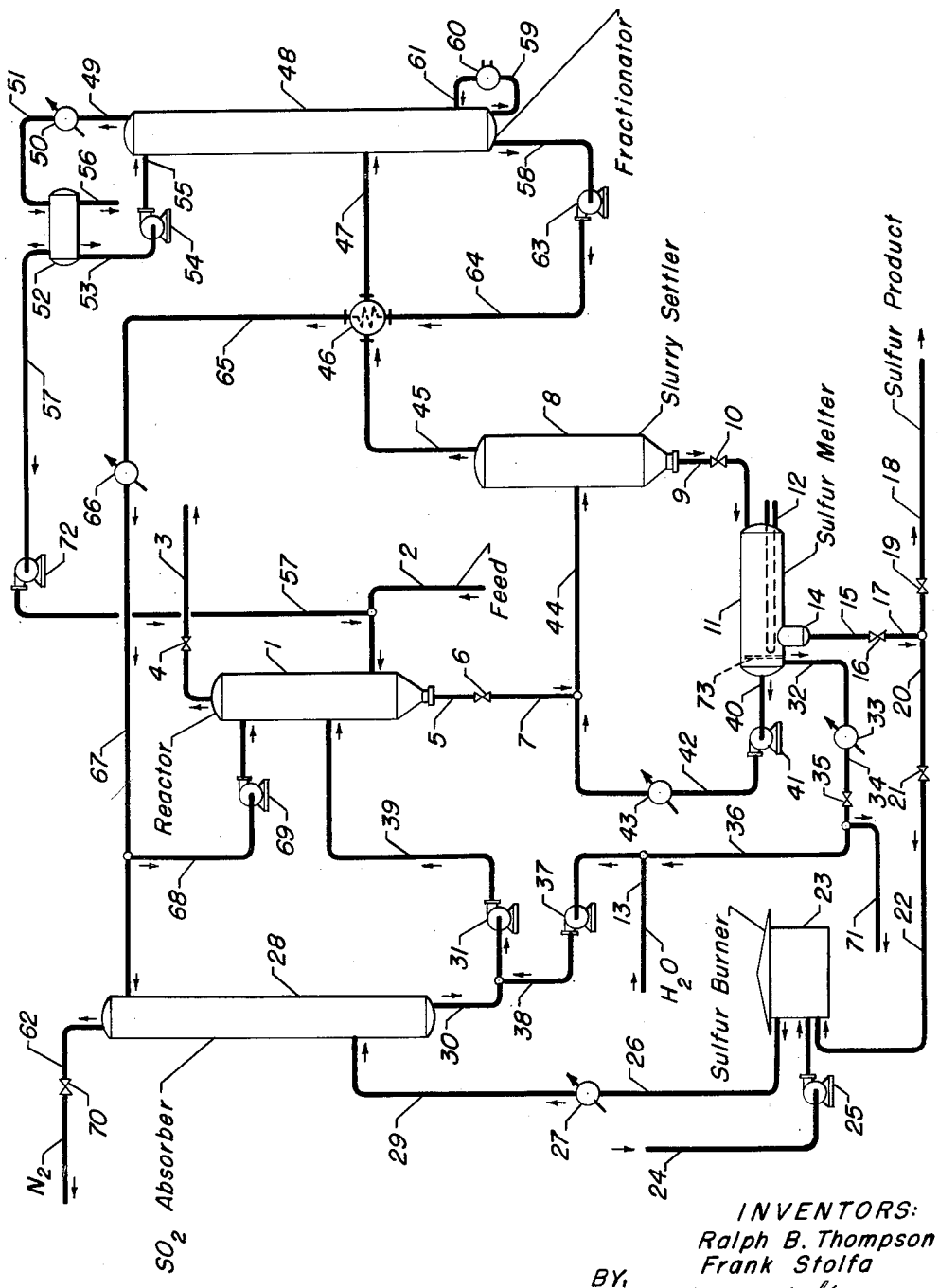

2,992,076
PRODUCTION OF SULFUR
Ralph B. Thompson, Hinsdale, and Frank Stolfa, Park Ridge, Ill., assignors to Universal Oil Products Company, Des Plaines, Ill., a corporation of Delaware
Filed Feb. 24, 1959, Ser. No. 795,216
6 Claims. (Cl. 23—225)

This invention relates to a method for the production of sulfur and particularly to a method for producing sulfur from hydrogen sulfide. In addition, the invention also relates to a method for purifying a gas stream by removing hydrogen sulfide from said stream.

In many industrial processes large amounts of sulfur are wasted by being vented to the atmosphere as hydrogen sulfide. Typical of these are processes for preparing various petroleum products, coking of coal, steel manufacture and others. In many cases, particularly in the refining of gasoline, the sulfur is a contaminant in the ultimate desired product and is converted to hydrogen sulfide during processing and disposed of in that form. Besides being wasteful, the venting of hydrogen sulfide to the atmosphere creates a nuisance, due to its unpleasant odor, which must be abated in many communities in order to conform to local regulations pertaining thereto.

Several solutions to this problem have been put into effect and these solutions are concerned in the most part with the abatement of the nuisance rather than the conservation of the sulfur thus produced. The processes are usually difficult to effect and, in the most part, are relatively costly, said processes usually consisting of converting the hydrogen sulfide to sulfur or sulfuric acid or to some other form of sulfur which is salable to industry. One such solution has been to separate the hydrogen sulfide from the main stream by such means as an absorber employing an alkaline liquid such as an amine or metal hydroxide solution in countercurrent contact with the hydrogen sulfide-containing gas. The absorbing liquid is then stripped of hydrogen sulfide and the hydrogen sulfide is partially burned to form sulfur dioxide and water, the remainder of the hydrogen sulfide being reacted with sulfur dioxide to produce sulfur and water. The reaction is effected at high temperatures and preferably at high pressures while utilizing a heterogeneous catalyst such as bauxite. This method has many unsatisfactory features including the expense and difficulty of concentrating hydrogen sulfide by means of an alkaline solution with subsequent stripping, the use of heterogeneous catalysts which are not too well suited to chemical processes resulting in solid products, the difficulty of using corrosive materials such as water-sulfur dioxide mixtures at high temperatures and, in fact, the added difficulty of employing high temperatures with the attendant cost of providing heating means and maintaining these means at the required temperatures. In addition, other prior art methods have employed a hygroscopic solvent wherein the sulfur dioxide and hydrogen sulfide may be dissolved and reacted in the presence of a catalytic amount of water to form sulfur. However, the solvents which have been used consisted of organic hydroxy materials such as mono- and poly-alcohols, one particular type of solvents which were used comprising ethylene glycol, diethylene glycol, triethylene glycol, etc. A disadvantage of using solvents of this type, particularly those of low molecular weight, is that this type of solvent is relatively expensive and, in order to make the process commercially feasible, must be recovered and recycled to the reactor, thus necessitating the added expense of a solvent recovery system which must operate at peak efficiency. A further disadvantage lies in the complete miscibility of water in glycol which requires that all of the water of reaction be removed by distillation. This could add substantially to the cost of solvent regeneration.

It is therefore an object of this invention to provide a process for recovering substantially pure sulfur from a gas stream containing hydrogen sulfide or mercaptans.

A further object of this invention is to provide a process for producing sulfur from a gas stream by providing a simple liquid phase low temperature process which will result in large conversions of hydrogen sulfide to substantially pure sulfur in a relatively inexpensive process.

One embodiment of this invention resides in a process for the production of sulfur which comprises absorbing sulfur dioxide and hydrogen sulfide in an alkyl aromatic hydrocarbon solvent which is free from hydrogen atoms on the alpha carbon atom in the alkyl radical, reacting said sulfur dioxide and hydrogen sulfide in contact with said solvent in free water thereby forming sulfur, separating said sulfur from said solvent and said water, fractionating said solvent at a temperature lower than about 320° F., and recovering substantially water-free solvent suitable for use in absorbing said sulfur dioxide.

A specific embodiment of this invention resides in a process for the production of sulfur which comprises absorbing sulfur dioxide and hydrogen sulfide in a water-saturated t-butylbenzene solvent, reacting said sulfur dioxide and said hydrogen sulfide in contact with said t-butylbenzene and a catalytic amount of free water thereby forming sulfur, separating said sulfur from said solvent and said water, fractionating said t-butylbenzene at a temperature in the range of from about 250° to about 320° F., and recovering substantially water-free t-butylbenzene suitable for use in absorbing said sulfur dioxide.

Other objects and embodiments referring to alternative solvents will be found in the following further detailed description of the invention.

As hereinbefore set forth an improved process for the production of sulfur by removing hydrogen sulfide from a refinery gas or natural gas stream has been discovered in which hydrogen sulfide is reacted with sulfur dioxide in contact with a water-saturated hydrocarbon solvent and a catalytic amount of free water. Thus, the amount of water necessary for the reaction is that amount of water required to saturate the hydrocarbon plus an excess to provide a two phase system. Various hydrocarbon solvents may be used in this invention, the preferred hydrocarbon solvents being those which dissolve a relatively small amount of water. Such hydrocarbon solvents may also be characterized as those which are substantially immiscible with sulfur at low temperatures and with large amounts of water.

The preferred hydrocarbon solvents consist of a narrow fraction of substituted aromatic hydrocarbons and particularly alkyl aromatic hydrocarbons containing from about 4 to about 10 carbon atoms in the alkyl side chain. In addition, it has further been discovered that alkyl aromatic hydrocarbons which are free from hydrogen atoms on the carbon atom alpha to the aromatic nucleus are particularly stable against reactions with sulfur and thus, the sulfur will be more readily separated from the solvent. Examples of alkyl aromatic hydrocarbons which may be used as solvents in the process of this invention include t-butylbenzene, α,α-dimethylpropylbenzene, α,α-dimethylbutylbenzene, α,α,β-trimethylbutylbenzene, α,α,β,β-tetramethylbutylbenzene, α,α-dimethylamylbenzene, α,α,β-trimethylamylbenzene, α,α,β-tetramethylamylbenzene, α,α-dimethylhexylbenzene, α,α,β-trimethylhexylbenzene, etc. It is to be understood that the above enumerated hydrocarbons are only representatives of the type of solvent which may be used and that the process of the present invention is not necessarily limited thereto. In the event that propyl alkyl aromatic hydrocarbons which are free from hydrogen atoms on the carbon atom alpha to the aromatic nucleus cannot be achieved without a direct synthesis, it may be possible to exhaustively treat the reaction products resulting from the condensation of an aromatic compound and an alkyl compound with sulfur to eliminate a more reactive species as a bottoms product and thereby separating a relatively inert preferred type of solvent by fractional distillation, crystallization, etc.

An advantage of using solvents of this type is that said solvents are relatively inexpensive and therefore a solvent recovery system is not required in the overall process of the present invention, thereby minimizing equipment needs in the present process. The omission of a solvent recovery system will therefore greatly reduce both the initial cost of the process and also reduce the operating cost during the operation thereof. When prior art organic solvents such as mono- and polyhydroxy alcohols are used, the cost of such solvents will necessitate the recovery thereof. Yet another advantage of using the process of this invention and in particular a solvent of the type hereinbefore set forth is that the sulfur thus produced during the reaction is in a granular form which is easily separable from the liquid phase, rather than a colloidal state, and is relatively insoluble in this type of solvent. Thus, the equipment required for separating the sulfur produced will be of a relatively more simple design and reduced cost. In order to produce sulfur according to this process it is necessary to have an excess of sulfur over the saturation point of sulfur in the hydrocarbon solvent before the sulfur will form in a granular state. Therefore, it may be advantageous to have the hydrocarbon solvent seeded with sulfur to aid in the reaction. This problem is overcome by the design of the process which is hereinafter described. Furthermore the sulfur dioxide-water corrosion which may take place will be limited to only those areas of the plant where a mixed water and hydrocarbon solvent phase appears, such as the reactor and the sulfur settler. This is a distinct advantage over prior art processes involving the use of hydroxy substituted solvents where the corrosion problem is a major factor in plant maintenance and replacement costs.

As will be noted from the description of the process hereinafter set forth it will be necessary to charge elemental sulfur and water to the system only at the start up of the process, after which the sulfur and water necessary for the production of sulfur dioxide and saturation of the solvent respectively will be furnished by the products resulting from the reaction of the process, the excess sulfur and water being removed from the system.

The process of this invention will be best described with reference to the accompanying drawing which is intended to be illustrative of the invention rather than limiting the broad scope thereof.

In the drawing a gas stream containing the hydrogen sulfide enters reactor 1 in the lower portion thereof through line 2. Reactor 1 is a conventional design countercurrent gas-liquid contacting vessel. The reaction takes place in the mixed hydrocarbon and water phases. The gas stream may be, for example, the normally gaseous material in the effluent from a petroleum desulfurization or reforming process, in which case it may be desirable to recirculate the hydrogen in the process. Prior to recirculation it may be desirable to remove the hydrogen sulfide from said gas inasmuch as hydrogen sulfide may have an adverse effect upon the catalysts employed in such processes. The gas passes up through reactor 1 and is contacted with a descending water and water-containing hydrocarbon solvent stream in which sulfur dioxide has been absorbed and which is introduced to reactor 1 through line 39. The reactor will contain internal means for effecting intimate contact between the rising gas stream and the descending liquid stream such as, but not limited to, perforated plates, bubble cap plates, turbo-grid trays, packings, screens or any other conventional means or device for causing such contact. The temperature of the reaction is maintained in the range of from about 75° to about 250° F. and the pressure in the range of from about atmospheric pressure to about 5000 p.s.i.g. The only limitation on this process is that the conditions must be such as to maintain the solvent in liquid phase at reaction conditions. With the solvent maintained at these conditions the absorbed sulfur dioxide and hydrogen sulfide react to form pure sulfur and water. Any residual hydrogen sulfide and/or sulfur dioxide are scrubbed from the ascending gas stream in an upper section of reactor 1 by contact with descending lean solvent introduced to the upper section of reactor 1 through line 68 by means of pump 69. The remaining gas passes from the reactor through line 3 provided with pressure control valve 4. The selection of a suitable hydrocarbon solvent and the use of proper operating conditions will cause substantially complete reaction of the hydrogen sulfide with sulfur dioxide so that the residual unreacted components in the liquid stream discharging from reactor 1 will be negligible. A liquid stream which contains organic hydrocarbon solvent, water and sulfur, passes out of the bottom of reactor 1 through line 5 provided with pressure control valve 6 and through line 7 to a slurry settler 8. In settler 8, the liquid reaction zone effluent settles into a hydrocarbon solvent layer and into a water-sulfur slurry layer. The water and sulfur with some hydrocarbon or a diluent are passed through line 9 provided with pressure control valve 10 into a sulfur melter 11 provided with heating means 12 and a baffle 73. The water, sulfur, and hydrocarbon slurry is then heated by means of an external source such as steam whereby the sulfur is melted to the molten state and passes into a drop-out pot container 14, after which it is withdrawn through line 15 provided with control valve 16 and line 17. The main portion of the sulfur product, or net sulfur produced, is withdrawn from the process through line 18 containing pressure control valve 19 to sulfur storage, not shown. Another portion of the sulfur may be passed through line 20 provided with valve 21 and through line 22 into a sulfur burner 23 where it is burned with air pumped in through line 24 by pump 25. The sulfur dioxide and nitrogen which are formed in the sulfur burner 23 are withdrawn through line 26 and cooled by means of a cooler 27 to a desired absorption temperature. From the cooler the sulfur dioxide and nitrogen enter a lower section of sulfur dioxide absorber 28 through line 29, absorber 28 being a conventional countercurrent gas-liquid contacting vessel. The sulfur dioxide is absorbed in a countercurrent manner in the lean dry solvent, of the type hereinbefore set forth, in absorber 28 and is withdrawn in solution in the solvent from the bottom of the absorber through line 30 by fat solvent pump 31. The nitrogen which is present is withdrawn from the top of absorber 28 through line 62 provided with pressure control valve 70. Sufficient water to more than saturate the fat solvent stream is added to line 30 through line 38 by pump 37. This water may be obtained from an external source through line 13 or may be drained from sulfur melter 11. In the latter case, the water is withdrawn from sulfur melter 11 through line 32 after passing over baffle 73 in the melter, cooled by means of cooler 33, and passed through line 34 provided with pressure control valve 35 through line 36 to pump 37. The excess water over what is required for the reaction is withdrawn from the system through line 71. The water is pumped through line 38 and is admixed with the aforesaid fat solvent containing the absorbed sulfur dioxide, said mixture then passing through solvent pump 31 and line 39 to reactor 1. The hydrocarbon which is recovered in sulfur melter 11 and which will contain a residual amount of dissolved sulfur is withdrawn from sulfur melter 11 through line 40 by pump 41 and is passed through line 42 to cooler 43. The hydrocarbon is then cooled and passes through line 44 back to the sulfur slurry settler 8 where additional sulfur will form in a granular state. The solvent is withdrawn overhead from sulfur settler 8 through line 45 and passes through heat exchanger 46 where the solvent is heated. The heated solvent containing low molecular weight hydrocarbons, dissolved sulfur and water passes through line 47 to fractionator 48 where the solvent and other components are fractionated azeotropically at a temperature lower than about 320° F. and preferably in a range of from about 250° to about 320° F. It has been discovered that if the temperature does not exceed the upper limit hereinbefore set forth, that is, 320° F., the reaction of the hydrocarbon solvent comprising an alkyl aromatic hydrocarbon free of hydrogen atoms on the carbon atom alpha to the aromatic nucleus with sulfur is markedly decreased.

The overhead products comprising low molecular weight hydrocarbons, traces of $SO_2$, water, and some solvent, are withdrawn from the top of fractionator 48 through line 49 provided with a cooler 50 wherein said overhead is condensed and passes through line 51 to a receiver 52. A portion of the liquid overhead is withdrawn from receiver 52 through line 53 provided with pump 54 and recycled to fractionator 48 through line 55, said liquid overhead acting as reflux. In receiver 52, the overhead separates into a hydrocarbon layer and a water layer. The water layer is withdrawn through line 56. Another portion of the overhead comprising light hydrocarbon gases is pumped through line 57 by means of pump 72 where it is admixed with fresh feed and passes into reactor 1 through line 2. The water-free hydrocarbon lean solvent is withdrawn from the bottom of fractionator 48 through line 58. A portion of the lean solvent is passed through line 59, heated by means of reboiler 60 which provides heat for fractionation zone 48, and passed through line 61 back to the fractionator. Another portion of the lean solvent is withdrawn from fractionator 48 through line 58 and passed by pump 63 to line 64 and heat exchanger 46. The cooled, regenerated lean solvent then passes through line 65 to cooler 66 where the solvent is cooled further. The soluble sulfur still present in the lean solvent granulates due to the reduction in temperature and is used as the seeding agent for the production of additional sulfur when the solvent is returned to the reactor through line 68 by means of pump 69. This results in larger granules which are more easily separated from the solvent. Another portion of the cooled solvent passes through line 67 back to the sulfur dioxide absorber 28 where the sulfur dioxide entering through line 29 is absorbed in a countercurrent manner.

The following example is given to illustrate the process of the present invention, which, however, is not intended to limit the generally broad scope of the present invention in strict accordance therewith.

*Example I*

106.4 moles of sulfur at a temperature of 250–270° F. and a pressure of 45 p.s.i.g. are charged to a sulfur burner wherein the sulfur is burned with 531.4 moles of air, comprising 106.4 moles of oxygen and 425.0 moles of nitrogen, said air being charged to the burner at a temperature of 60° F. and a pressure of 45 p.s.i.g. The resultant 106.4 moles of sulfur dioxide and 425 moles of nitrogen are passed to a cooler. The gases are cooled and pass into a sulfur dioxide absorber at a temperature of 110° F. and a pressure of 45 p.s.i.g. In the absorber the sulfur dioxide is contacted with a downward flowing stream of lean dry solvent which has been charged to said absorber at a temperature of 110° F. and a pressure of 40 p.s.i.g. whereby the sulfur dioxide is absorbed therein. The nitrogen which entered the absorber along with the sulfur dioxide is vented overhead, said overhead gas comprising 410 moles of nitrogen and 2.1 moles of sulfur dioxide. The fat solvent containing the absorbed sulfur dioxide is withdrawn from the bottom of the absorber at a temperature of 112° F., said bottoms containing 85.3 moles of sulfur, 104.3 moles of sulfur dioxide and 5.1 moles of nitrogen. Before passing to the reactor the fat solvent is admixed with 57.2 moles of water at a temperature of 60° F. and a pressure of 500 p.s.i.g. The water saturated solvent comprising 1250 moles of a hydrocarbon solvent of the type hereinbefore set forth, such as alkyl aromatics which are free from hydrogen atoms on the carbon atom of the alkyl chain which is alpha to the aromatic nucleus, 57.2 moles of water, 5.1 moles of nitrogen, 104.3 moles of sulfur dioxide and 85.3 moles of granular and dissolved sulfur is then charged to a reactor at a temperature of 112° F. and a pressure of 500 p.s.i.g. A feed stock containing 57.1 moles of nitrogen, 50.0 moles of carbon dioxide, 208.6 moles of hydrogen sulfide, 3080 moles of methane, 112.5 moles of ethane, 67.2 moles of propane, 33.6 moles of butanes, 10.6 moles of pentanes, 9.6 moles of hexanes, 4.2 moles of heptanes, 1.8 moles of octanes, and 0.6 mole of nonanes, is charged to the reactor at a temperature of 100° F. and a pressure of 500 p.s.i.g. In this reactor the hydrogen sulfide reacts with the sulfur dioxide which is absorbed in the solvent and the sulfur is produced at the interface between the water and the solvent. The overhead from the reactor is withdrawn at a temperature of 110° F. and a pressure of 500 p.s.i.g. to a gas concentration plant, said overhead containing 60.42 moles of nitrogen, 40.98 moles of carbon dioxide, 2774.4 moles of methane, 77.75 moles of ethane, 35.48 moles of propane, 12.28 moles of butanes, 2.03 moles of pentanes, 0.82 mole of hexanes, and 0.15 mole of heptanes, 0.04 mole of octanes, 0.01 mole of nonanes, 6.2 moles of water and 1.4 moles of solvent. The bottoms from the reactor are withdrawn at a temperature of 160° F. and a pressure of 100 p.s.i.g. and passed to a slurry settler. The reactor bottoms contain 408.3 moles of sulfur, 1.78 moles of nitrogen, 9.02 moles of carbon dioxide, 305.60 moles of methane, 34.75 moles of ethane, 31.73 moles of propane, 21.32 moles of butanes, 8.57 moles of pentanes, 8.78 moles of hexanes, 4.05 moles of heptanes, 1.76 moles of octanes, 0.59 mole of nonanes, 259.51 moles of water and 1373.1 moles of solvent. In the slurry settler the liquid reaction zone effluent settles into a hydrocarbon solvent layer and a water-sulfur slurry layer. The bottoms from the slurry settler are passed to a sulfur melter at a temperature of about 160° F. and a pressure of 100 p.s.i.g., the bottoms to the sulfur melter containing 350.7 moles of sulfur, 0.29 mole of nitrogen, 1.07 moles of carbon dioxide, 35.80 moles of methane, 4.07 moles of ethane, 3.73 moles of propane, 2.50 moles of butanes, 1.0 mole of pentanes, 1.02 moles of hexanes, 0.47 mole of heptanes, 0.20 mole of octanes, 0.07 mole of nonanes, 262.50 moles of water, 137.31 moles of solvent. In the sulfur melter the mixture is heated by means of an external source to a temperature of about 250°–270° F. wherein the sulfur is melted and passes out of the sulfur melter into a drop-out pot. The sulfur is withdrawn from the drop-out pot at a temperature of about 250°–270° F. and a pressure of 90 p.s.i.g., a portion of the net sulfur thus prodced going to a sulfur storage plant, another portion of said sulfur being changed to the sulfur burner at a temperature of 250°–270° F. and a pressure of 45 p.s.i.g. Water is also withdrawn from the sulfur melter at a temperature of about 250° F. and passes to a cooler where it is cooled to a temperature of approximately 110° F., a portion being withdrawn as surplus while another portion is recycled to be admixed with the fat solvent passing from the sulfur dioxide absorber, thereby providing the water of saturation for the fat solvent and the excess required to provide a two phase system whereby sulfur is formed at the interface between the two phases. The hydrocarbon solvent layer from the sulfur melter is withdrawn and passed to a cooler where said solvent is cooled to a temperature of about 160° F. at a pressure of about 100 p.s.i.g. This stream which contains 38.20 moles of sulfur, 0.29 mole of nitrogen, 1.70 moles of carbon dioxide, 35.80 moles of methane, 4.07 moles of ethane, 3.73 moles of propane, 2.50 moles of butanes, 1.0 mole of pentanes, 1.02 moles of hexanes, 0.47 mole of heptanes, 0.20 mole of octanes, 0.07 mole of nonanes, 5.7 moles of water and 137.31 moles of solvent is recycled to the slurry settler, being admixed with the bottoms from the reactor before admission into said slurry settler.

The hydrocarbon solvent layer in the slurry settler is withdrawn as overhead at a temperature of 162° F., said overhead containing 94.75 moles of sulfur, 1.78 moles of nitrogen, 9.02 moles of carbon dioxide, 305.6 moles of methane, 34.75 moles of ethane, 31.72 moles of propane, 21.32 moles of butane, 8.57 moles of pentanes, 8.78 moles of hexanes, 4.05 moles of heptanes, 1.76 moles of octanes, 0.59 mole of nonanes, 2.78 moles of water and 1373.10 moles of solvent. This overhead is passed to a heat exchanger where the mixture is heated to a temperature of about 310° F. and is passed to a fractionator where the solvent and other components are fractionated azeotropically. The bottoms from the fractionator comprising 1373.10 moles of solvent and 94.75 moles of sulfur dissolved therein are withdrawn from the bottom of the fractionator at a temperature of 320° F. and a pressure of about 10 p.s.i.g. These bottoms are pumped through a heat exchanger wherein the bottoms are partially cooled. The partially cooled bottoms are then passed through a cooler and further cooled to a temperature of about 110° F., precipitating granular sulfur as it cools. A portion of this lean dry solvent containing the granular sulfur which is required to seed the reaction is passed through a pump, wherein the pressure is raised to 500 p.s.i.g., to the upper portion of the reactor while another portion of the lean dry solvent at a temperature of 110° F. and atmospheric pressure passes to the top of the sulfur dioxide absorber. The overhead from the fractionator is withdrawn at a temperature of about 245° F. and a pressure of 55 p.s.i.g. to a cooler wherein the effluent is cooled to a temperature of approximately 110° F. The thus cooled overhead containing 1.78 moles of nitrogen, 9.02 moles of carbon dioxide, 305.6 moles of methane, 34.75 moles of ethane, 31.72 moles of propane, 21.32 moles of butanes, 8.57 moles of pentanes, 8.78 moles of hexanes, 4.05 moles of heptanes, 1.76 moles of octanes, 0.59 mole of nonanes and 2.78 moles of water is passed to a receiver. A portion of this overhead is withdrawn from the receiver and recycled to the fractionator as liquid overhead acting as a reflux, the gas portion of the overhead being admixed with fresh feed and passing into the reactor while another portion is withdrawn as natural gas to a stabilizer.

We claim as our invention:

1. A process for the production of sulfur which comprises absorbing sulfur dioxide and hydrogen sulfide in an alkyl aromatic hydrocarbon solvent which is free from hydrogen atoms on the alpha carbon atom in the alkyl radical and containing at least 4 and not more than about 10 carbon atoms in the alkyl radical, reacting said sulfur dioxide and hydrogen sulfide in contact with said solvent and free water thereby forming sulfur, separating said sulfur from said solvent and said water, fractionating said solvent at a temperature lower than about 320° F., and recovering substantially water-free solvent suitable for use in absorbing said sulfur dioxide.

2. A process for the production of sulfur which comprises absorbing sulfur dioxide and hydrogen sulfide in a water-saturated t-butylbenzene solvent, reacting said sulfur dioxide and said hydrogen sulfide in contact with said t-butylbenzene and a catalytic amount of free water thereby forming sulfur, separating said sulfur from said solvent and said water, fractionating said t-butylbenzene at a temperature in the range of from about 250° to about 320° F., and recovering substantially water-free t-butylbenzene suitable for use in absorbing said sulfur dioxide.

3. A process for the production of sulfur which comprises absorbing sulfur dioxide and hydrogen sulfide in a water-saturated $\alpha,\alpha$-dimethylpropylbenzene solvent, reacting said sulfur dioxide and said hydrogen sulfide in contact with said $\alpha,\alpha$-dimethylpropylbenzene and a catalytic amount of free water thereby forming sulfur, separating said sulfur from said solvent and said water, fractionating said $\alpha,\alpha$-dimethylpropylbenzene at a temperature in the range of from about 250° to about 320° F., and recovering substantially water-free $\alpha,\alpha$-dimethylpropylbenzene suitable for use in absorbing said sulfur dioxide.

4. A process for the production of sulfur which comprise absorbing sulfur dioxide and hydrogen sulfide in a water-saturated $\alpha,\alpha$-dimethylbutylbenzene solvent, reacting said sulfur dioxide and said hydrogen sulfide in contact with said $\alpha,\alpha$-dimethylbutylbenzene and a catalytic amount of free water thereby forming sulfur, separating said sulfur from said solvent and said water, fractionating said $\alpha,\alpha$-dimethylbutylbenzene at a temperature in the range of from about 250° to about 320° F., and recovering substantially water-free $\alpha,\alpha$-dimethylbutylbenzene suitable for use in absorbing said sulfur dioxide.

5. A process for the production of sulfur which comprises absorbing sulfur dioxide and hydrogen sulfide in a water-saturated $\alpha,\alpha,\beta$-trimethylbutylbenzene solvent, reacting said sulfur dioxide and said hydrogen sulfide in contact with said $\alpha,\alpha,\beta$-trimethylbutylbenzene and a catalytic amount of free water thereby forming sulfur, separating said sulfur from said solvent and said water fractionating said $\alpha,\alpha,\beta$-trimethylbutylbenzene at a temperature in the range of from about 250° to about 320° F., and recovering substantially water-free $\alpha,\alpha,\beta$-trimethylbutylbenzene suitable for use in absorbing said sulfur dioxide.

6. A process for the production of sulfur which comprises absorbing sulfur dioxide and hydrogen sulfide in a water-saturated $\alpha,\alpha,$-dimethylamylbenzene solvent, reacting said sulfur dioxide and said hydrogen sulfide in contact with said $\alpha,\alpha$-dimethylamylbenzene and a catalytic amount of free water thereby forming sulfur, separating said sulfur from said solvent and said water, fractionating said $\alpha,\alpha$-dimethylamylbenzene at a temperature in the range of from about 250° to about 320° F., and recovering substantially water-free $\alpha,\alpha$-dimethylamylbenzene suitable for use in absorbing said sulfur dioxide.

References Cited in the file of this patent

UNITED STATES PATENTS

| | | |
|---|---|---|
| 2,043,084 | Ward et al. | June 2, 1936 |
| 2,614,904 | Royer | Oct. 21, 1952 |
| 2,881,047 | Townsend | Apr. 7, 1959 |